Sept. 30, 1924.
J. A. JANNEY
1,510,280
ADVERTISING DEVICE
Filed June 9, 1922
Fig. 1,
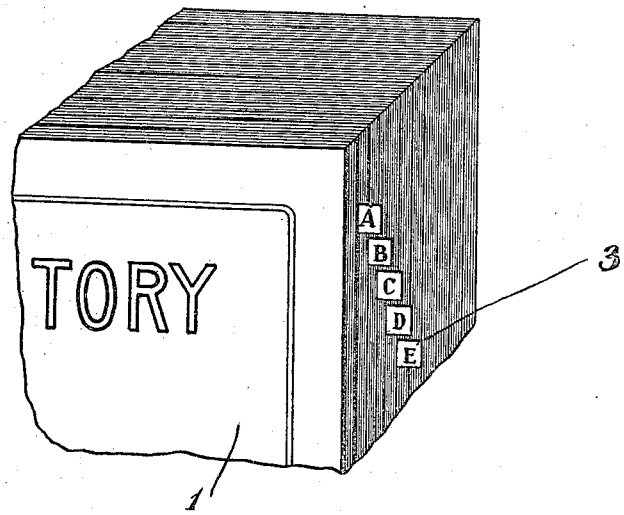
Fig. 2,
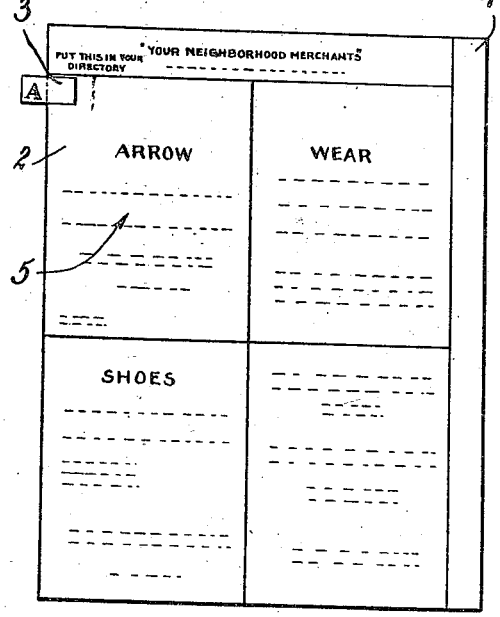
Fig. 3.
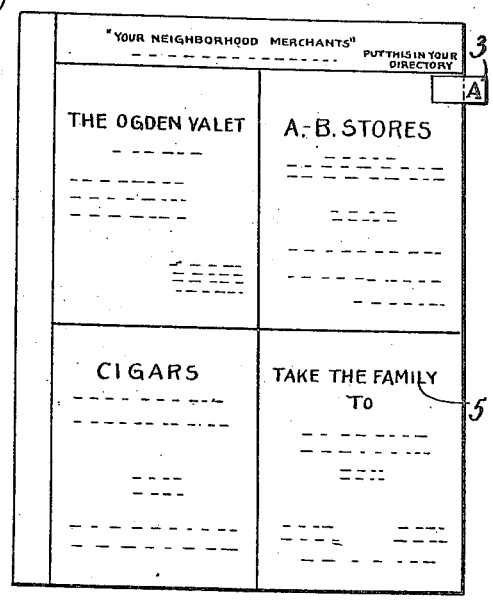
INVENTOR
Joseph A. Janney,
BY
ATTORNEYS Patented Sept. 30, 1924.

1,510,280

UNITED STATES PATENT OFFICE.

JOSEPH ALLISON JANNEY, OF ELIZABETH, NEW JERSEY.

ADVERTISING DEVICE.

Application filed June 9, 1922. Serial No. 566,975.

*To all whom it may concern:*

Be it known that I, JOSEPH ALLISON JANNEY, a citizen of the United States, residing at Elizabeth, in the county of Union, State of New Jersey, have invented certain new and useful Improvements in Advertising Devices; and I do hereby declare the following to be a full, clear, and exact description of the invention, such as will enable others skilled in the art to which it appertains to make and use the same.

My invention is an improvements in advertising devices, and relates particularly to devices for use in connection with volumes of indexed subjects, as for instance telephone directories, and the like.

With the usual directory, the finding of a name, when the name is known, is merely a matter of searching under the proper heading. Neither is the finding of a representative of a business or profession, as for instance a physician or a dentist, a matter of insuperable difficulty. Merely running over the names beneath the headings will eventually lead to one of a representative of the class desired. However, when the name is found, it may be that of a representative in a distant part of the city, too remote to be available, especially in an emergency. With a classified directory the labor of finding a representative of a business occupation is lessened, but only to a slight degree as regards that of finding one within a reasonable distance.

The average person will live in the same city block for weeks, and even months, without having occasion for the services of a professional man, as for instance a doctor or dentist, and without the need arising for quick communication with a business establishment. Such average person may see the card of a doctor or dentist and the like, in his or her immediate neighborhood, but without observing it. That is the card impresses the mind as being that of a professional man, but not enough to leave any impression of name or address. The same applies to business establishments to a less degree. Even when such average person has business transactions with an establishment, he or she is prone to pay slight attention to the name, even when known, especially when the transactions are infrequent, and the amounts involved small.

When occasion arises for quick communication, such average person is at a loss, and waste of time, inconvenience, and confusion results. With visitors and new comers to a neighborhood, the matter assumes a serious aspect. Such visitors or new comers have no business or professional connections in the neighborhood, and as a rule, they are wholly ignorant as to the relative merits of local establishments and professional men. If for instance it were possible to learn by a glance at a telephone directory, for example, information concerning representatives of every usual class of business and profession in the locality, that is in a restricted area immediately about the subscriber, such annoyance and confusion would be avoided.

On the other hand increased business and increased profits would result to the representative who were enterprising enough to arrange for the presentation of their names, addresses and telephone numbers in such manner. Whenever anyone consulted the directory, they would see these names set apart from all the others, and would know that they were names of representatives in the immediate neighborhood, and all easily accessible.

In the present invention I provide a device of this character, wherein sheets corresponding in number to the letters of the alphabet, and of a size corresponding approximately to that of the directory, are provided, each sheet having an index tag bearing a letter of the alphabet, the sheets being adapted to be intercalated between the leaves of the directory, at the headings of the index with the index tags extending beyond the leaves, to facilitate the opening of the directory at the desired place. Each sheet has printed on the opposite faces thereof display cards, bearing the names, addresses, telephone numbers and the like of single representatives from various classes of business and professional establishments in a restricted area or zone. The sheets are arranged in sets of two or more, and the sets are alike so that whenever the directory is opened, a series of cards pertaining to the zone in which the directory is located will be presented to view.

In the drawings:

Figure 1 is a perspective view of a portion of a directory provided with the advertising device.

Figure 2 is a plan view of one of the sheets.

Figure 3 is a similar view from the opposite side.

The present embodiment of the invention is shown in connection with a directory 1, in the present instance a telephone directory, although it is obvious that the device might be used with directories of any character. The improvement comprises a plurality of sheets 2, corresponding in number to the letters of the alphabet, and in size corresponding substantially to that of the leaves of the directory with which they are to be used. Each sheet carries at a suitable point in one edge, an index tag 3, and the tag has printed on both faces thereof a letter of the alphabet, each sheet bearing a different letter.

The sheets are intercalated between the leaves of the directory, at the headings of the various lists of names. As for instance the sheet having the letter "A" is placed at that point in the directory where the list of names under "A" commences. In the same manner "B" is placed at the heading of the names commencing with "B" and in like manner the other sheets are placed. Means may be provided if desired for securing the sheets in place. As for instance each sheet may have a line of adhesive at the side remote from the index tag. When the sheets are placed, this adhesive is moistened, and the edge of the sheet is stuck to the leaf. As shown in the drawings, each sheet is provided with a strip 4 of flexible material, as for instance cloth, at the edge remote from the index tag. The strip is gummed on one face, and a portion of the said face is secured to the sheet, the free edge being adapted to be moistened and secured to the leaf of the directory.

The sheets are arranged in sets, two or more in a set, and the sets are alike. Printed on the opposite faces of the sheets of each set is a series of display cards, indicated at 5. These cards are the cards of representatives of the most usual business, professional and occupational classes. As for instance there may be the cards of a doctor, a dentist, a grocer, an electrician, an expressman, a tailor, a shoemaker, a laundry and so on. Sixteen classes will as a rule include the most usual classes, and those which might be needed in an emergency. When the sheets are arranged in sets of two, each set may carry sixteen display cards, each card occupying one-fourth of a page. It will be obvious that the number of cards to the set may be varied, and that the number of sheets to the set may be more than two. It is preferable however, that the sheets be arranged in sets of two or more, so that the same information will be repeated throughout the directory. When arranged in sets of two, whenever the directory is consulted, whatever the letter at which it is opened, at least one sheet and the cards thereon will be presented to view.

The display cards on the sheets are representatives of professions, businesses or occupations within a restricted area or zone. In practice a city for instance will be divided into zones, the number and the size varying with conditions. Within each zone a single representative from a number of classes of professions, businesses or occupations will be chosen and the names of these representatives, with address, and telephone number, and any other desired information will be placed on the sheets pertaining to that zone. The names on the sheets will differ in the different zones, but the sheets for each zone will carry the names of representatives located in the zone. The space on the sheets will be sold to the representatives at a figure depending upon conditions and a new set of sheets will be furnished with each directory. The device offers to merchants in various localities or zones, a means of reaching a group of prospective customers, with advertising at a reasonable cost. In practice a set of twenty-six indexed sheets will be prepared for each subscriber in a zone, to be used in the telephone or other directory. The space on each sheet will be sold to professional or business men within the zone at a stipulated price, and the space on the sheets of any one zone will be sold only to individuals in that zone. The sets of twenty-six sheets each will be distributed, each set being accompanied by a letter, advising the subscriber of the purpose and the use of the sheets.

It will be evident from the description that the improved device converts a general directory into what is in effect a local or neighborhood directory. It also facilitates consultation of the directory for any purpose, and it especially facilitates the search for a representative of a professional, business or occupational class. Preferably the names on the sheets will be arranged alphabetically, though this is not essential, where such names are for instance only sixteen in number. Without departing from the spirit of the invention, a general directory may be converted into a complete local or neighborhood directory. With this arrangement all of the names in the directory within a restricted area or zone in the immediate neighborhood of the place where the directory is located will be placed on the sheets in alphabetical arrangement and as many sheets may be used for a set as may be necessary to contain the names.

I claim:

1. A device of the class described for use with alphabetically indexed directories, comprising a plurality of sheets of substantially the size of the leaves of the directory, and adapted to be intercalated between these leaves, each sheet having an index tag projecting from the margin thereof, and each sheet having printed thereon a selection of representative names of persons and business establishments of different classes within a restricted area or zone representing a part only of the total area covered by the directory.

2. A device of the class described for use with alphabetically indexed directories, comprising a plurality of sheets of substantially the size of the leaves of the directory and adapted to be intercalated between these leaves at the index headings, each sheet having an index tag adapted to extend beyond the edges of the leaves when the sheets are in place, each sheet having printed thereon a selection of representative names of persons and business establishments located within a restricted area or zone representing a part only of the total area covered by the directory, and each sheet having means in connection therewith for securing said sheet to a leaf of the directory.

In testimony whereof I affix my signature.

JOSEPH ALLISON JANNEY.